J. ROBINGSON.
Traction-Wheel.
No. 15,820.
Patented Sept 30, 1856.
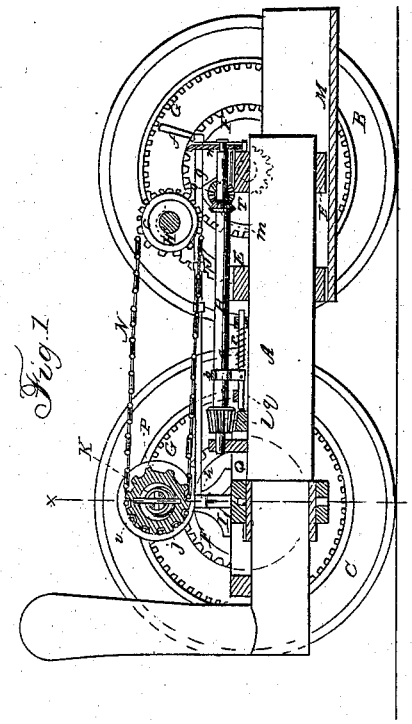
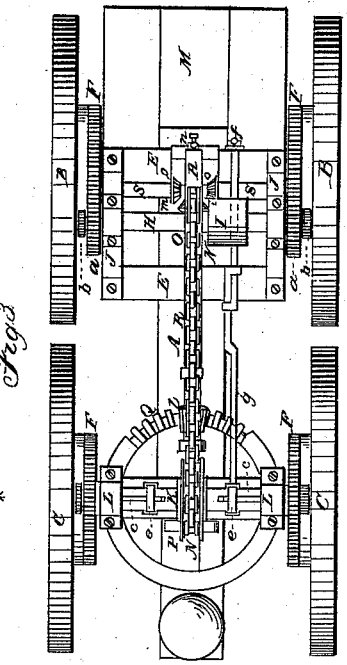
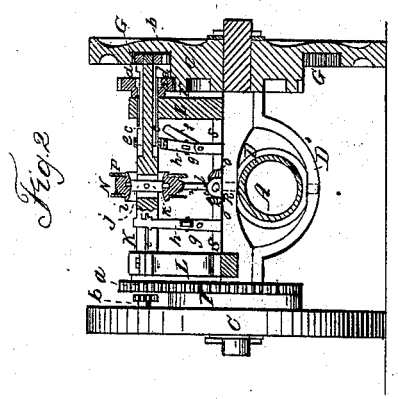

UNITED STATES PATENT OFFICE.

JNO. ROBINGSON, OF NEW BRIGHTON, PENNSYLVANIA.

LOCOMOTIVE FOR ROADS, &c.

Specification of Letters Patent No. 15,820, dated September 30, 1856.

*To all whom it may concern:*

Be it known that I, JOHN ROBINGSON, of New Brighton, in the county of Beaver and State of Pennsylvania, have invented certain new and useful Improvements in Locomotives for Running on Common Roads and for Plowing and other Agricultural Purposes; and I do hereby declare that the following is a full, clear, and exact description of the same, reference being had to the annexed drawings, making part of this specification, in which—

Figure 1, is a central longitudinal vertical section of a locomotive constructed according to my invention. Fig. 2, is a transverse vertical section of the same in the line $x, x$, of Fig. 1. Fig. 3, is a plan of the same.

Similar letters of reference indicate corresponding parts in the several figures.

A, is a long horizontal cylindrical boiler suspended below the axles of two pair of wheels B, B, and C, C, of large diameter and of broad tread. The axle of the hind wheels B, B, is attached to a carriage E, which is firmly secured to the rear part of the boiler and the axle of the fore wheels C, C, to a gimbal frame D, $D^1$, the inner part D, of which is fitted to turn around the boiler for the wheels to accommodate themselves to any unevenness of the road, and the outer part $D^1$, being fitted to turn on D, in a plane parallel with the longitudinal center of the boiler to allow the wheels to turn in either direction to the right or left. The wheels are fitted loosely to their axles which are firmly secured to their respective carriage E, and frame D, $D^1$. The wheels B, B, and C, C, have severally attached to them an external toothed gear F, and a larger internal toothed gear G.

H, is the main shaft of a rotary engine I, said shaft having its bearings in standards J, J, erected upon the carriage E, and carrying two large spur pinions $a, a$, and two smaller ones $b, b$, and the latter with the gears G, G, to drive the wheels B, B, and thus give motion to the locomotive over the ground. The pinions $a, a$, are employed under ordinary circumstances when the locomotive is on a level and a quick motion is wanted, and those $b, b$, when a slow powerful motion is wanted for running up hill or over heavy roads or ground.

K, is a shaft similar to H,—except that it has no direct application of steam power to it,—fitted to bearings in standards L, L, erected on the top of the fore or outer portion $D^1$, of the gimbal frame, or, as the said portion $D^1$, may be termed, "the truck." This shaft carries pinions $a, a$, and $b, b$, like those on the shaft H, to gear with the gears on the fore wheels C, C, and make them serve as drivers as well as the hind wheels. The pinions $a, a$, are severally at all times in gear with the gears F, F, but are arranged to turn on the shafts when the small ones are in gear. The smaller pinions $b, b$, are fitted to slide longitudinally on the shafts for the purpose of being thrown in and out of gear with the gears G, G, and each one has attached to it two rods $c, c$, which lie within grooves on opposite sides of the shaft, as shown to the right hand of Fig. 2, said rods being connected by a ring $e$, and carrying each a wing $d$, to enter one of two grooves in the hub of the corresponding pinion $a$.

By sliding the ring $e$, upon the shaft the small pinions $b, b$, are thrown in or out of gear, and by the same means the wings $d, d$, are made to uncouple or couple the pinions $a, a$, with the shaft, so that when the pinions $b, b$, are out of gear, those $a, a$, are coupled, and vice versa. The change of gearing is to be effected by means of any suitable arrangement of levers applied to the rings $e, e$, so as to be under the direction of the engineer who stands upon the platform M, of the carriage E.

$f, g, h$, show parts of an arrangement of levers applied to one of the rings for that purpose. The shaft K, derives motion from the engine shaft H, by means of an endless chain N, running from a sprocket wheel O, fast on the latter shaft to a sprocket wheel P, on the former one. In order that the sprocket wheel P, may adapt itself to the direction of the chain, to prevent the chain slipping off or being twisted or broken in turning curves, when the shaft K, is not parallel with the shaft H, it is fitted to the shaft in such manner as to have a universal movement. This movement may be provided for in more than one way, as is well known, but I have chosen to show the wheel, see Fig. 2, fitted to move on two pivots $i, i$, at the ends of a bar $j$, which is placed diametrically across the inside of the wheel and constitutes the arms thereof, the said bar passing through a slot in the shaft and being allowed to work on a pivot $k$, which intersects the axis of the shaft at right angles. The wheel P, is flanged on both sides.

Q, is a toothed sector standing behind the truck D¹, and firmly attached thereto.

R, is a shaft arranged on bearings longitudinally of the locomotive, carrying at the forward end a bevel gear *l*, gearing with the toothed sector Q, and at the other end a bevel gear *m*, which, by a slight movement of the rear bearing of the shaft R, effected by means of a lever *n*, provided for the purpose, may be thrown into gear with either one of two bevel gears *o, o*, on the inner ends of two small shafts S, S, which are in suitable bearings parallel with the axles and carry at their outer ends pinions *p, p*, which gear with spur gears T, T, attached to the driving wheels B, B. The shafts S, S, with their bevel gears *o, o*, receive rotary motion from the driving wheels B, B, when the locomotive is running and will give motion to the bevel gear *m*, and its shaft R, in either direction that may be desired, and the bevel gear will give motion to the toothed sector Q, to turn the front driving wheels C, C, either to the right or left as may be wished. When the locomotive is running straight the bevel gear *m*, stands between the gears *o, o*, but out of gear, and the sector Q, is locked to prevent it turning, by means of a sliding spring bolt *q*, which is connected with the shaft R, by a loose collar *t*, fitted to a groove *u*, as shown in Fig. 1, and is made by the action of the spring *r*, coiled around it to slide in between the teeth of the sector when the lever *n*, at the rear end of the shaft R, is left free. The operation of the sliding spring bolt *q*, requires a certain longitudinal motion of the shaft R, and before the rear end of the shaft is moved laterally to throw the pinion *n*, into gear it must be drawn back for the bolt to unlock the sector.

What I claim as my invention, and desire to secure by Letters Patent, is,

1. Combining the sliding bolt *q*, by which the sector on the fore truck is locked, with the rotating shaft R, which carries the gear which operates upon the sector to turn the fore truck, by means of a loose collar *t*, and groove *u*, or in an equivalent manner, whereby the bolt may be operated by a longitudinal movement of the said shaft, as herein fully described.

2. Fitting the sprocket wheel P, to the shaft K, which drives the fore wheels with a universal joint to enable it to adapt itself to the direction of the driving chain when the said shaft K, is not parallel with the engine shaft, and thus to prevent the chain slipping off the wheel or being twisted or broken, substantially as herein described.

JNO. ROBINGSON.

Witnesses:
C. R. TUTTLE,
JOHN M. TUTTLE.